(12) United States Patent
Porte et al.

(10) Patent No.: US 10,836,503 B2
(45) Date of Patent: Nov. 17, 2020

(54) AIR INTAKE STRUCTURE FOR AN AIRCRAFT NACELLE

(71) Applicants: Airbus (S.A.S.); Airbus Operations (S.A.S.), Toulouse (FR)

(72) Inventors: Alain Porte, Colomiers (FR); Eric Haramburu, Colomiers (FR); Patrick Oberle, Verdun sur Garonne (FR); Grégory Albet, Toulouse (FR); Vincent Billerot, Fonsorbes (FR); Frédéric Piard, Tournefeuille (FR); Franck Oundjian, Bonrepos sur Aussonnelle (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 239 days.

(21) Appl. No.: 15/847,207

(22) Filed: Dec. 19, 2017

(65) Prior Publication Data
US 2018/0201387 A1    Jul. 19, 2018

(30) Foreign Application Priority Data

Dec. 20, 2016  (FR) ...................................... 16 62815

(51) Int. Cl.
*B64D 33/02* (2006.01)
*F02C 7/045* (2006.01)
*F02C 7/047* (2006.01)

(52) U.S. Cl.
CPC .............. *B64D 33/02* (2013.01); *F02C 7/045* (2013.01); *F02C 7/047* (2013.01);
(Continued)

(58) Field of Classification Search
CPC ................... B64D 33/02; B64D 33/00; B64D 2033/0206; B64D 2033/0233;
(Continued)

(56) References Cited

U.S. PATENT DOCUMENTS 4,817,756 A * 4/1989 Carr ....................... B64D 29/00
                                                        181/213
5,683,062 A * 11/1997 Spiro ..................... B64D 33/02
                                                        244/121
(Continued)

FOREIGN PATENT DOCUMENTS

EP        1715160 A1    10/2006
EP        2366624 A1    9/2011
(Continued)

OTHER PUBLICATIONS

French Search Report for Application No. 1662815 dated Aug. 25, 2017.

*Primary Examiner* — Assres H Woldemaryam
(74) *Attorney, Agent, or Firm* — Jenkins, Wilson, Taylor & Hunt, P.A.

(57) ABSTRACT

An aircraft nacelle air intake structure including an air intake lip with a U-shaped section to ensure air is shared between an inner face and an outer face. An acoustic panel is on the intake lip rear on the side of the inner face level with a first assembly point. An outer panel is on the intake lip rear on the side of the outer face level with a second assembly point. A front reinforcing frame on the intake lip inside is fixed to the air intake lip on the side of the inner face level with a first fixing point and on the side of the outer face level with a second fixing point. The length of the chord between the stop point and each fixing point is between ⅓ and ⅙ of the total chord between the stop point and the assembly point.

19 Claims, 2 Drawing Sheets

(52) U.S. Cl.
CPC ........... *B64D 2033/0206* (2013.01); *B64D 2033/0233* (2013.01); *B64D 2033/0286* (2013.01); *F05D 2220/323* (2013.01); *F05D 2250/75* (2013.01); *F05D 2260/83* (2013.01); *F05D 2260/96* (2013.01); *Y02T 50/672* (2013.01)

(58) Field of Classification Search
CPC .... B64D 2033/2073; B64D 2033/2086; F02C 7/045; F02C 7/047
USPC .......................................... 241/53
See application file for complete search history.

(56) References Cited

U.S. PATENT DOCUMENTS

| | | | | |
|---|---|---|---|---|
| 6,443,395 | B1* | 9/2002 | Porte | B64D 15/04 244/134 R |
| 8,602,346 | B2* | 12/2013 | Porte | B64D 33/02 244/1 N |
| 8,783,619 | B2* | 7/2014 | Hormiere | B64D 15/04 244/134 B |
| 8,876,054 | B2* | 11/2014 | Porte | B64D 33/02 244/134 B |
| 9,010,084 | B2* | 4/2015 | Chelin | B64D 15/04 137/15.1 |
| 9,346,549 | B2* | 5/2016 | Pirat | B64D 15/04 |
| 9,764,847 | B2* | 9/2017 | Wright | B64D 13/08 |
| 2005/0006529 | A1* | 1/2005 | Moe | B64D 15/12 244/134 D |
| 2008/0179448 | A1* | 7/2008 | Layland | B64D 15/12 244/1 N |
| 2010/0199629 | A1* | 8/2010 | Chene | B64D 15/12 60/39.093 |
| 2012/0261521 | A1* | 10/2012 | Porte | B64D 29/00 244/53 B |
| 2014/0023492 | A1* | 1/2014 | Lucas | F01D 21/045 415/200 |
| 2015/0191239 | A1 | 7/2015 | Porte et al. | |
| 2018/0100434 | A1* | 4/2018 | Dindar | B64D 33/02 |

FOREIGN PATENT DOCUMENTS

| | | |
|---|---|---|
| FR | 2887518 A1 | 12/2006 |
| FR | 3016159 A1 | 7/2015 |
| WO | WO 2009/136062 A2 | 11/2009 |

* cited by examiner

AIR INTAKE STRUCTURE FOR AN AIRCRAFT NACELLE

CROSS REFERENCE TO RELATED APPLICATION

This application claims priority to co-pending French Patent Application FR 16 62815, filed Dec. 20, 2016, the content of which is incorporated by reference herein in its entirety.

TECHNICAL FIELD

The present disclosure relates to an air intake structure for an aircraft nacelle, an aircraft nacelle comprising an intake structure of this kind and also an aircraft comprising at least one nacelle of this kind.

BACKGROUND

An aircraft engine comprises a nacelle which houses the engine itself. The nacelle, which is annular in shape, exhibits an air intake structure at the front.

By convention, the terms "front" and "rear" are used throughout the text taking as their point of reference the front and rear of the engine.

An air intake structure generally comprises an inner face and an outer face in contact with the outside air, whereas the inner face delimits or defines a flow path which constitutes the fan duct.

The function of an air intake structure is to ensure the aerodynamic flow of the air, firstly towards the fan duct and secondly towards the outside of the nacelle.

The air intake structure comprises an air intake lip, a front reinforcing frame, an acoustic panel and an outer panel.

The air intake lip has a U-shaped section which is open towards the rear. It forms the outer casing of the front portion of the air intake structure and ensures that the air is shared between the portion which penetrates the fan duct and the portion which flows around the nacelle.

The outer panel extends the air intake lip on the outer side and constitutes a portion of the outer face.

The front reinforcing frame likewise has a U-shaped section which is open towards the rear and it is positioned on the inside and at the rear of the air intake lip. The front reinforcing frame ensures the mechanical strength of the front portion of the nacelle and helps to preserve the shape and the dimensions thereof.

The acoustic panel forms the inner casing of the nacelle, behind the air intake lip, on the side of the fan duct. The acoustic panel therefore constitutes a portion of the inner face.

The acoustic panel exhibits a structure capable of attenuating noises and is of a composite sandwich type.

On the side of the inner face, the front reinforcing frame is fixed, firstly to the air intake lip, for example by rivets, and secondly to the acoustic panel level with its front portion, for example by rivets.

On the side of the outer face, the front reinforcing frame is fixed firstly to the air intake lip, for example by rivets, and secondly to the outer panel by rivets.

The space which is located at the front between the air intake lip and the reinforcing frame is supplied with hot gas coming from the engine. This hot gas then reheats the air intake lip to avoid the formation of ice.

The aircraft engines tend to exhibit increasingly high by-pass ratios, which results in a significant increase in the temperature of the hot gas emanating from the engine.

Although the air intake lip and the front reinforcing frame which are made of aluminum alloy are able to withstand the relative high temperatures, this is not the case with the acoustic panel and the outer panel which are made of composite materials.

The temperature of the hot gas could therefore eventually reach values which are incompatible with the composite materials making up the acoustic panel and the outer panel.

SUMMARY

An object of the present disclosure is an air intake structure which allows better removal of the heat level with the air intake lip.

To this end, an air intake structure for a nacelle of an aircraft is disclosed, the air intake structure comprising:
- an air intake lip with a U-shaped section which is open towards the rear and ensures that the air is shared between an inner face and an outer face and exhibits a stop point,
- an acoustic panel fixed to the rear of the air intake lip on the side of the inner face level with a first assembly point,
- an outer panel fixed to the rear of the air intake lip on the side of the outer face level with a second assembly point,
- a front reinforcing frame positioned on the inside of the air intake lip and fixed to the air intake lip on the side of the inner face level with a first fixing point and on the side of the outer face level with a second fixing point, and
- the air intake structure being such that the length of the chord between the stop point and each fixing point is between $\frac{1}{3}$ and $\frac{1}{6}$ of the total chord between the stop point and the assembly point situated on the same side.

The position of the front reinforcing frame allows removal of the heat between the junction of the front reinforcing frame and the air intake lip and the acoustic panel and the outer panel which are no longer impacted by possible temperature increases.

According to an embodiment, the fixing to the first fixing point and the fixing to the second fixing point are ensured by rivets.

According to an embodiment, the fixing to the first fixing point and the fixing to the second fixing point are ensured by welding.

According to an embodiment, the fixing to the first fixing point and the fixing to the second fixing point are ensured by the fact that the air intake lip and the front reinforcing frame constitute a single part realized integrally from a single material.

Advantageously, the air intake lip and the front reinforcing frame are made of a titanium alloy.

Advantageously, the length of the chord on the air intake lip between the stop point and the fixing point of the inner face is between 170 and 320 mm, the length of the chord on the air intake lip between the stop point and the fixing point of the outer face is between 150 and 250 mm, the length of the chord on the air intake lip between the fixing point of the inner face and the first assembly point of the inner face is between 20 and 80 mm and the length of the chord on the air intake lip between the fixing point of the outer face and the second assembly point of the outer face is between 15 and 80 mm.

The disclosure herein likewise discloses a nacelle for an aircraft engine, the nacelle exhibiting an air intake structure according to one of the preceding variants, a feed pipe which removes hot gas from the engine and injects it into a space between the air intake lip and the front reinforcing frame, a control unit, a pressure sensor provided to measure the pressure in the feed pipe and a single valve mounted on the feed pipe and provided to adopt, alternately, an open position in which it allows the hot gas to pass through into the feed pipe or a closed position in which it does not allow the hot gas to pass through into the feed pipe in which the position of the valve is controlled by the control unit depending on the pressure information that the control unit receives from the pressure sensor.

The disclosure herein likewise discloses an aircraft comprising at least one nacelle according to the preceding variant.

BRIEF DESCRIPTION OF THE DRAWINGS

The aforementioned characteristics of the disclosure herein, as well as others, will become more clearly apparent on reading the following description of an exemplary embodiment, the description being provided in relation to the attached, example drawings, in which.

DETAILED DESCRIPTION

Figure 1:
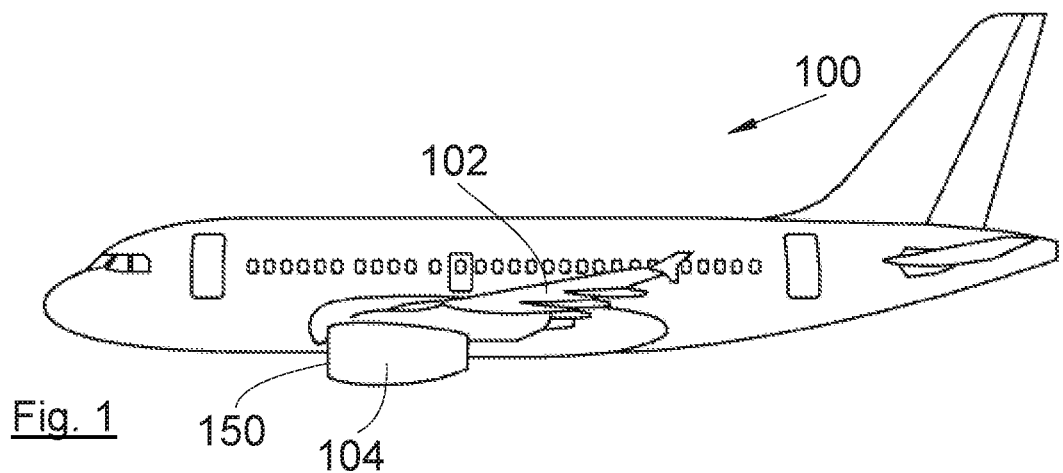
FIG. 1 is a side view of an aircraft exhibiting an air intake structure according to the disclosure herein.

FIG. 1 shows an aircraft 100 which exhibits a wing 102 and, beneath the wing, a nacelle 104 according to the disclosure herein in which an engine is housed.

The front of the nacelle 104 exhibits an air intake structure 150 according to the disclosure herein.

Figure 2:
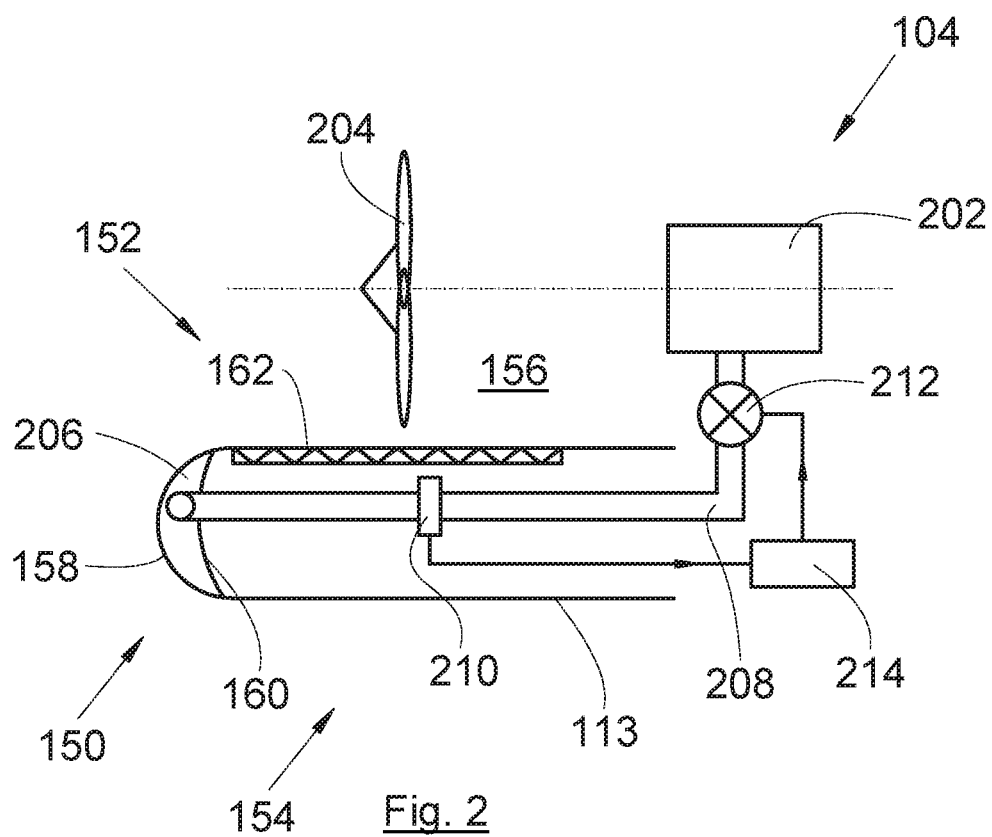
FIG. 2 is a sectional schematic representation of a nacelle according to the disclosure herein.

FIG. 2 shows the nacelle 104 on the inside of which the engine 202 is housed.

The nacelle 104 is annular in shape and the air intake structure 150 comprises an inner face 152 and an outer face 154 in contact with the outside air, whereas the inner face 152 delimits or defines a flow path 156 which constitutes the fan duct.

A fan 204 is housed in the fan duct 156.

The air intake structure 150 comprises, among other things, an air intake lip 158, an acoustic panel 162, a front reinforcing frame 160 and an outer panel 113.

The air intake lip 158 exhibits a U-shaped section which is open towards the rear, forms the outer casing of the front portion of the air intake structure 150 and ensures the air is shared between the inner face 152 and the outer face 154.

The outer panel 113 extends the air intake lip 158 on the side of the outer face 154 towards the rear and thereby constitutes a portion of the outer face 154.

The acoustic panel 162 extends the air intake lip 158 on the side of the inner face 152, in other words on the side of the fan duct 156, towards the rear and thereby constitutes a portion of the inner face 152.

The front reinforcing frame 160 has a U-shaped section which is open towards the rear and is positioned on the inside of the air intake lip 158. The front reinforcing frame 160 ensures the mechanical strength of the front portion of the nacelle 104 and helps to preserve the shape and dimensions thereof.

The air intake structure 150 comprises a space 206 between the air intake lip 158 and the front reinforcing frame 160.

The nacelle 104 likewise exhibits a supply pipe 208 which removes hot gas from the engine 202, in particular in the high-pressure section of the engine 202, and injects it into the space 206 crossing the front reinforcing frame 160.

In order to regulate the amount of hot gas injected into the space 206, the nacelle 104 comprises a control unit 214, a pressure sensor 210 provided to measure the pressure in the supply pipe 208 and a single valve 212 mounted on the supply pipe 208 and provided to adopt, alternately, an open position in which it allows the hot gas to pass into the supply pipe 208 or a closed position in which it does not allow the hot gas to pass into the feed pipe 208. The position of the valve 212 is controlled by the control unit 214 depending on the pressure information that the control unit 214 receives from the pressure sensor 210. The control unit 214 is in the shape of a processor, for example.

Figure 3:
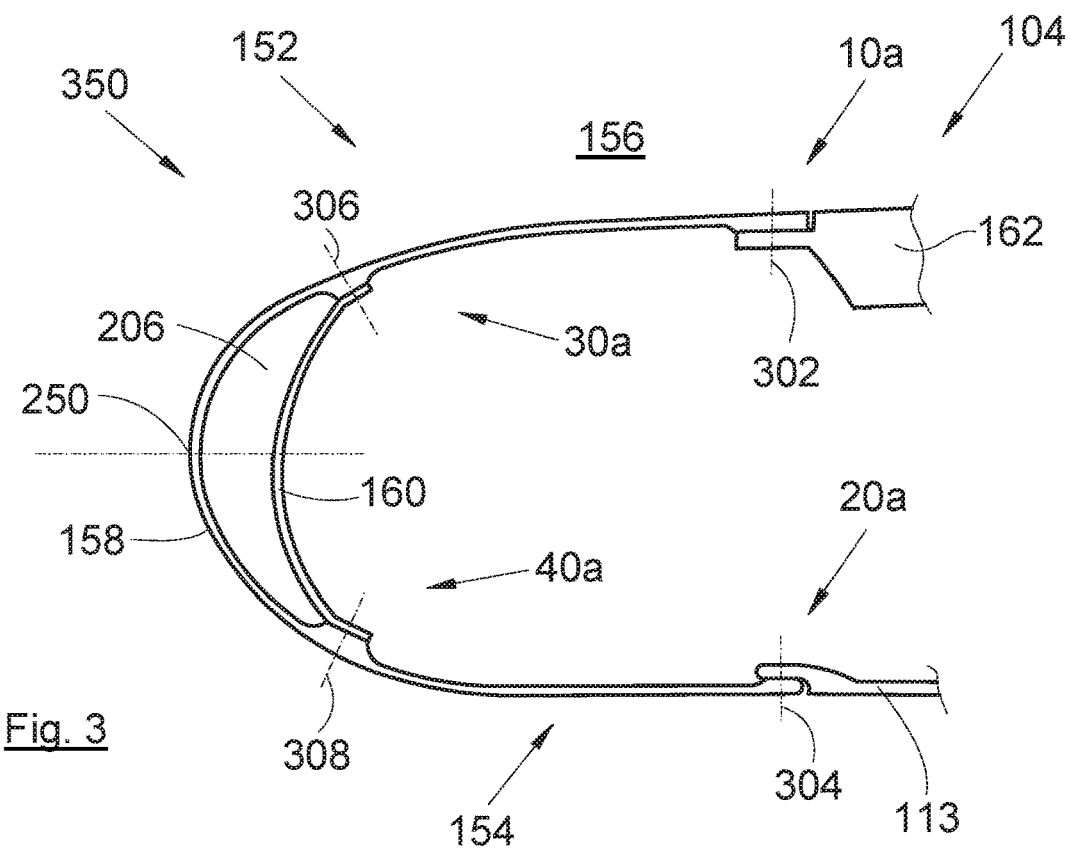
FIG. 3 is a sectional view of an air intake structure according to a first embodiment of the disclosure herein.
Figure 4:
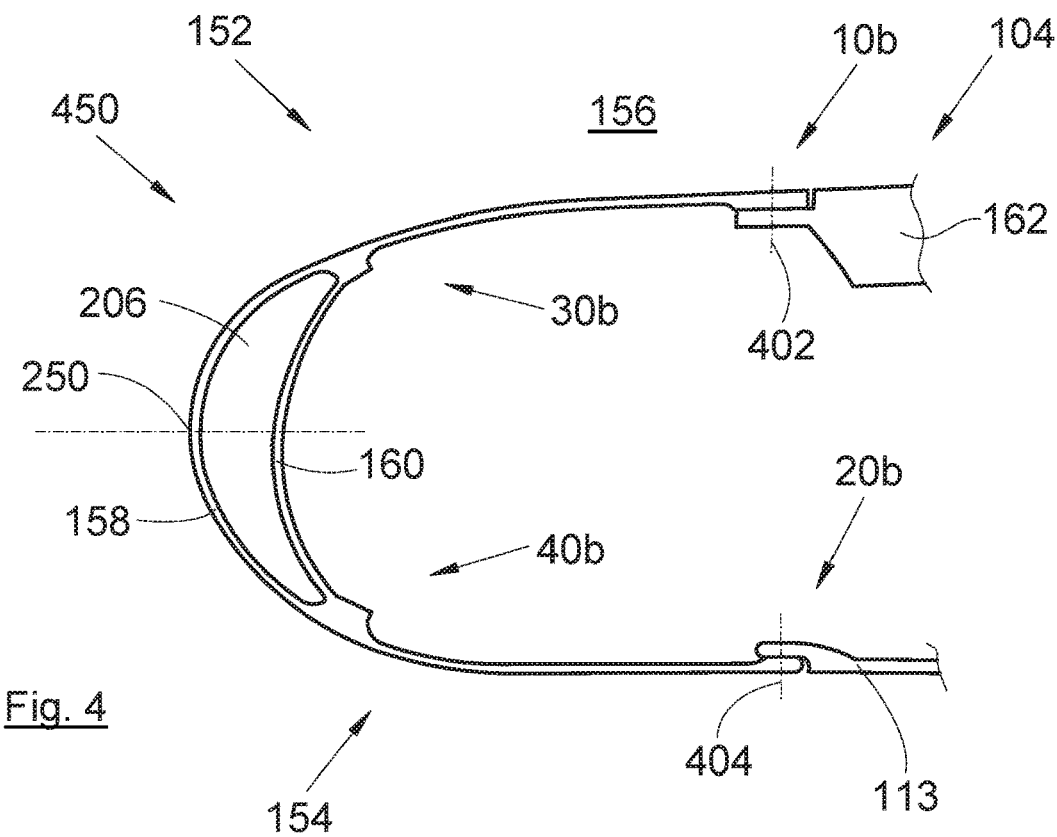
FIG. 4 is a sectional view of an air intake structure according to a second embodiment of the disclosure herein.

FIG. 3 shows an air intake structure 350 according to a first embodiment of the disclosure herein and FIG. 4 shows an air intake structure 450 according to a second embodiment of the disclosure herein.

On the side of the inner face 152, the rear of the air intake lip 158 is fixed to the front portion of the acoustic panel 162 level with a first assembly point 10a, 10b, for example by rivets symbolized by a dot-dash line 302, 402.

On the side of the outer face 154, the rear of the air intake lip 158 is fixed to the front portion of the outer panel 113 level with a second assembly point 20a, 20b, for example by rivets symbolized by a dot-dash line 304, 404.

On the side of the inner face 152, the front reinforcing frame 160 is fixed to the inside of the air intake lip 158 level with a first fixing point 30a, 30b.

On the side of the outer face 154, the front reinforcing frame 160 is fixed to the air intake lip 158 level with a second fixing point 40a, 40b.

With respect to the stop point 250 of the air intake lip 158, in other words the point at which the air speed is zero, in other words the point of the foremost air intake lip 158, the length of the chord between the stop point 250 and each fixing point 30a-b, 40a-b is between ⅓ and ⅙ of the total chord between the stop point 250 and the assembly point 10a-b, 20a-b situated on the same side, in other words on the side of the inner face 152 or on the side of the outer face 154.

This kind of positioning of the front reinforcing frame 160 allows the heat source, in other words the space 206 filled with hot gas, to be moved away from the acoustic panel 162 and from the outer panel 113.

The portion of the air intake lip 158 between the fixing points 30a-b, 40a-b and the assembly points 10a-b, 20a-b constitutes a radiator which removes the heat and the acoustic panel 162 and the outer panel 113 are no longer impacted by possible temperature increases.

In the embodiment in FIG. 3, the fixing to the first fixing point 30a is ensured by rivets symbolized by a dot-dash line 306 and the fixing to the second fixing point 40a is ensured by rivets symbolized by a dot-dash line 308.

In the embodiment in FIG. 4, the fixing to the first fixing point 30b is ensured by welding and the fixing to the second fixing point 40b is ensured by welding. The first fixing point 30b and the second fixing point 40b constitute welding zones.

In the embodiments in FIG. 4, the air intake lip 158 and the front reinforcing frame 160 may constitute a single part realized integrally from a single material, for example by 3D printing. The first fixing point 30b and the second fixing point 40b constitute integral zones of a single material.

Depending on the temperature of the hot gas, the air intake lip 158 and the front reinforcing frame 160 may be realized in different materials such as, for example, aluminum alloy.

So that the air intake lip 158 and the front reinforcing frame 160 are able to withstand very high temperatures, they are advantageously made of titanium alloy.

According to an embodiment:
the length of the chord on the air intake lip 158 between the stop point 250 and the fixing point 30a-b of the inner face 152 is between 170 and 320 mm,
the length of the chord on the air intake lip 158 between the stop point 250 and the fixing point 40a-b of the outer face 154 is between 150 and 250 mm,
the length of the chord on the air intake lip 158 between the fixing point 30a-b of the inner face 152 and the first assembly point 10a-b of the inner face 152 is between 20 and 80 mm, depending on the drop in temperature to be reached, and
the length of the chord on the air intake lip 158 between the fixing point 40a-b of the outer face 154 and the second assembly point 20a-b of the outer face 154 is between 15 and 80 mm, depending on the drop in temperature to be reached.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air intake structure for a nacelle of an aircraft, the air intake structure comprising:
an air intake lip in a form of a U-shaped section, which is open towards a rear of the air intake structure, ensures that air is shared between an inner face of the air intake structure and an outer face of the air intake structure, and has a stop point, which is a foremost point of the air intake lip;
an acoustic panel fixed directly to a rear of the air intake lip on a side of the inner face of the air intake structure, in a position level with a first assembly point;
an outer panel fixed behind the air intake lip on a side of the outer face of the air intake structure, in a position level with a second assembly point; and
a front reinforcing frame that is positioned inside of the air intake lip and is fixed to the air intake lip at a first fixing point, which is on the side of the inner face of the air intake structure, and at a second fixing point, which is on the side of the outer face of the air intake structure, thereby defining a space between the air intake lip and the front reinforcing frame;
wherein a chord length between the stop point and the first fixing point is from ⅓ to ⅙, inclusive, of a chord length between the stop point and the first assembly point;
wherein a chord length between the stop point and the second fixing point is from ⅓ to ⅙, inclusive, of a chord length between the stop point and the second assembly point; and
wherein the air intake structure is configured such that the space between the air intake lip and the front reinforcing frame receives hot gas from an aircraft engine to prevent ice formation on the air intake lip.

2. The air intake structure according to claim 1, wherein the front reinforcing frame is attached to the air intake lip by rivets at the first fixing point and/or at the second fixing point.

3. The air intake structure according to claim 1, wherein the front reinforcing frame is welded to the air intake lip at the first fixing point and/or at the second fixing point.

4. The air intake structure according to claim 1, wherein, at the first fixing point and/or at to the second fixing point, the air intake lip and the front reinforcing frame are formed integrally from a single material.

5. The air intake structure according to claim 1, wherein the air intake lip and the front reinforcing frame comprise a titanium alloy.

6. A nacelle for an aircraft engine, the nacelle comprising:
an air intake structure comprising:
an air intake lip in a form of a U-shaped section, which is open towards a rear of the air intake structure, ensures that air is shared between an inner face of the air intake structure and an outer face of the air intake structure, and has a stop point, which is a foremost point of the air intake lip;
an acoustic panel fixed directly to a rear of the air intake lip on a side of the inner face of the air intake structure, in a position level with a first assembly point;
an outer panel fixed behind the air intake lip on a side of the outer face of the air intake structure, in a position level with a second assembly point; and
a front reinforcing frame that is positioned inside of the air intake lip and is fixed to the air intake lip at a first fixing point, which is on the side of the inner face of the air intake structure, and at a second fixing point, which is on the side of the outer face of the air intake structure;
wherein a chord length between the stop point and the first fixing point is from ⅓ to ⅙, inclusive, of a chord length between the stop point and the first assembly point; and
wherein a chord length between the stop point and the second fixing point is from ⅓ to ⅙, inclusive, of a chord length between the stop point and the second assembly point;
a feed pipe configured to remove hot gas from the engine and to inject the hot gas into a space between the air intake lip and the front reinforcing frame;
a control unit;
a pressure sensor configured to measure pressure in the feed pipe and to transmit pressure information to the control unit; and
a single valve mounted on the feed pipe and configured to adopt, alternately, an open position, in which the valve allows the hot gas to pass through the feed pipe, and a closed position, in which the valve does not allow the hot gas to pass through the feed pipe, wherein a position of the valve is controlled by the control unit depending on the pressure information that the control unit receives from the pressure sensor.

7. An aircraft comprising at least one nacelle according to claim 6.

8. The nacelle according to claim 6, wherein the front reinforcing frame is attached to the air intake lip by rivets at the first fixing point and/or at the second fixing point.

9. The nacelle according to claim 6, wherein the front reinforcing frame is welded to the air intake lip at the first fixing point and/or at the second fixing point.

10. The nacelle according to claim 6, wherein, at the first fixing point and/or at to the second fixing point, the air intake lip and the front reinforcing frame are formed integrally from a single material.

11. The nacelle according to claim 6, wherein, at the first fixing point and/or at to the second fixing point, the air intake lip and the front reinforcing frame are formed as a single part.

12. The nacelle according to claim 6, wherein the air intake lip and the front reinforcing frame comprise a titanium alloy.

13. The nacelle according to claim 6, wherein the acoustic panel and the outer panel are made of one or more composite materials.

14. The nacelle according to claim 6, wherein the front reinforcing frame has a U-shaped section, which is open towards a rear of the air intake structure.

15. The nacelle according to claim 6, wherein an inner portion of the air intake lip between the first fixing point and the first assembly point and/or an outer portion of the air intake lip between the second fixing point and the second assembly point are configured as a radiator to dissipate heat from the hot gas in the space prior to the heat being conducted to the acoustic panel and/or the outer panel.

16. The air intake structure according to claim 1, wherein, at the first fixing point and/or at to the second fixing point, the air intake lip and the front reinforcing frame are formed as a single part.

17. The air intake structure according to claim 1, wherein the acoustic panel and the outer panel are made of one or more composite materials.

18. The air intake structure according to claim 1, wherein the front reinforcing frame has a U-shaped section, which is open towards a rear of the air intake structure.

19. The air intake structure according to claim 1, wherein an inner portion of the air intake lip between the first fixing point and the first assembly point and/or an outer portion of the air intake lip between the second fixing point and the second assembly point are configured as a radiator to dissipate heat from the hot gas in the space prior to the heat being conducted to the acoustic panel and/or the outer panel.

\* \* \* \* \*